(12) United States Patent
Shingo (10) Patent No.: US 11,667,160 B2
(45) Date of Patent: Jun. 6, 2023

(54) PNEUMATIC TIRE

(71) Applicant: SUMITOMO RUBBER INDUSTRIES, LTD., Hyogo (JP)

(72) Inventor: Nobukuni Shingo, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 217 days.

(21) Appl. No.: 16/534,046

(22) Filed: Aug. 7, 2019

(65) Prior Publication Data

US 2020/0062044 A1 Feb. 27, 2020

(30) Foreign Application Priority Data

Aug. 21, 2018 (JP) .............................. JP2018-154503

(51) Int. Cl.
*B60C 13/00* (2006.01)
*B60C 11/01* (2006.01)
*B60C 13/02* (2006.01)

(52) U.S. Cl.
CPC .............. *B60C 13/02* (2013.01); *B60C 11/01* (2013.01); *B60C 13/002* (2013.01)

(58) Field of Classification Search
CPC .......... B60C 13/02; B60C 13/00; B60C 11/01
See application file for complete search history.

(56) References Cited

U.S. PATENT DOCUMENTS

| | | | | |
|---|---|---|---|---|
| 6,123,131 A * | 9/2000 | Takada | ...................... | B60C 3/04 152/454 |
| 10,836,218 B2 * | 11/2020 | Kuwano | ................. | B60C 13/02 |
| 2009/0159166 A1 * | 6/2009 | Sakamoto | ............... | B60C 11/01 152/209.16 |
| 2010/0200135 A1 * | 8/2010 | Ohara | ..................... | B60C 13/02 152/209.16 |
| 2010/0288409 A1 * | 11/2010 | Ohara | ..................... | B60C 11/01 152/209.11 |

(Continued)

FOREIGN PATENT DOCUMENTS

| | | | | |
|---|---|---|---|---|
| EP | 3219516 | | 9/2017 | |
| JP | 2004291936 A | * | 10/2004 | ............. B60C 13/02 |

(Continued)

OTHER PUBLICATIONS

JP 2004-291936 Machine Translation; Obara, Masaaki (Year: 2004).*
JP 2004-291938 English Machine Translation; Obara, Masaaki (Year: 2004).*

*Primary Examiner* — Robert C Dye
*Assistant Examiner* — Nicholas J Weiler
(74) *Attorney, Agent, or Firm* — Greenblum & Bernstein, P.L.C.

(57) ABSTRACT

A pneumatic tire has a large number of protector ribs on a side surface thereof. Each protector rib projects from a profile of the tire. The protector rib has an outer end and an inner end. A shape of a cross-section of the outer end is convex inward in an axial direction. The shape of the cross-section of the outer end is preferably a circular arc. A shape of a cross-section of the inner end is convex inward in the axial direction. The shape of the cross-section of the inner end is preferably a circular arc. The tire further has a lateral groove. An intersection angle of an axially outer end of this lateral groove relative to the profile is not less than 100° and not greater than 140°.

10 Claims, 6 Drawing Sheets

(56) References Cited

U.S. PATENT DOCUMENTS

| | | | |
|---|---|---|---|
| 2011/0088821 A1* | 4/2011 | Imakita | B60C 11/0302 |
| | | | 152/209.15 |
| 2011/0126950 A1* | 6/2011 | Barton | B60C 11/01 |
| | | | 152/209.11 |
| 2017/0174007 A1 | 6/2017 | Kuwano | |
| 2017/0210182 A1 | 7/2017 | Mori et al. | |
| 2018/0065422 A1 | 3/2018 | Kuwano | |
| 2018/0086155 A1* | 3/2018 | Matsubara | B60C 11/01 |
| 2019/0299719 A1* | 10/2019 | Murata | B60C 11/01 |
| 2021/0129594 A1* | 5/2021 | Furusawa | B60C 11/01 |

FOREIGN PATENT DOCUMENTS

| | | | | |
|---|---|---|---|---|
| JP | 2004291938 A | * | 10/2004 | B60C 13/02 |
| JP | 2017-128267 A | | 7/2017 | |
| WO | 2017208862 | | 12/2017 | |

\* cited by examiner

PNEUMATIC TIRE

This application claims priority on Patent Application No. 2013-154503 filed in JAPAN on Aug. 21, 2018. The entire contents of this Japanese Patent Application are hereby incorporated by reference.

BACKGROUND OF THE INVENTION

Field of the Invention

The present invention relates to pneumatic tires. Specifically, the present invention relates to improvement of protector ribs of pneumatic tires.

Description of the Related Art

A tire that is mounted to a four-wheel-drive vehicle such as a SUV is frequently used for running on a bad road. The tire is required to have cut resistance. The tire is further required to have traction performance (mud traction performance) on a mud road surface.

JP2017-128267 discloses a tire having a protector at each sidewall thereof. The protector projects from the sidewall. The protector can prevent a sharp stone or the like from coming into contact with the sidewall. Therefore, the tire has excellent cut resistance. Moreover, the protector can shear mud. Therefore, the tire has excellent mud traction performance.

When the tire is used for running on a bad road, great force is applied to the protector. Stress is concentrated on an end of the protector. There is concern that a crack may occur in the vicinity of the end due to the stress. The tire, in which a large number of cracks have occurred, no longer withstands being used. The cracks impair the durability of the tire.

A tire having a protector that greatly projects from each sidewall thereof has very excellent mud traction performance. However, in the tire, great stress is concentrated on an end of the protector. The protector greatly impairs the durability of the tire.

An object of the present invention is to provide a pneumatic tire having excellent mud traction performance and durability.

SUMMARY OF THE INVENTION

A pneumatic tire according to the present invention includes a tread and a sidewall. The tire further includes protector ribs projecting from a profile of the tire. A shape of a cross-section, taken along a meridian of the tire, of an end of each protector rib is convex inward in an axial direction.

In the pneumatic tire according to the present invention, each protector rib shears mud. Since the shape of the end of each protector rib is convex inward in the axial direction, stress concentration at the end is inhibited. A crack is less likely to occur in the vicinity of the end. The tire has excellent mud traction performance and durability.

Preferably, an intersection angle of the end relative to the profile is not greater than 10°.

Preferably, the shape of the cross-section of the end is a curved line. Preferably, the shape of the cross-section is a circular arc. Preferably, the circular arc has a radius of not less than 20 mm and not greater than 200 mm.

The tire may further include a lateral groove formed mainly on the tread. An intersection angle of an axially outer end of the lateral groove relative to the profile is not less than 100° and not greater than 140°.

Preferably, a sum (Hi+De) of a maximum height Hi of each protector rib and a depth De of the lateral groove is not less than 4.5 mm and not greater than 6.5 mm.

DESCRIPTION OF THE PREFERRED EMBODIMENTS

The following will describe in detail the present invention based on preferred embodiments with appropriate reference to the drawings.

Figure 1:
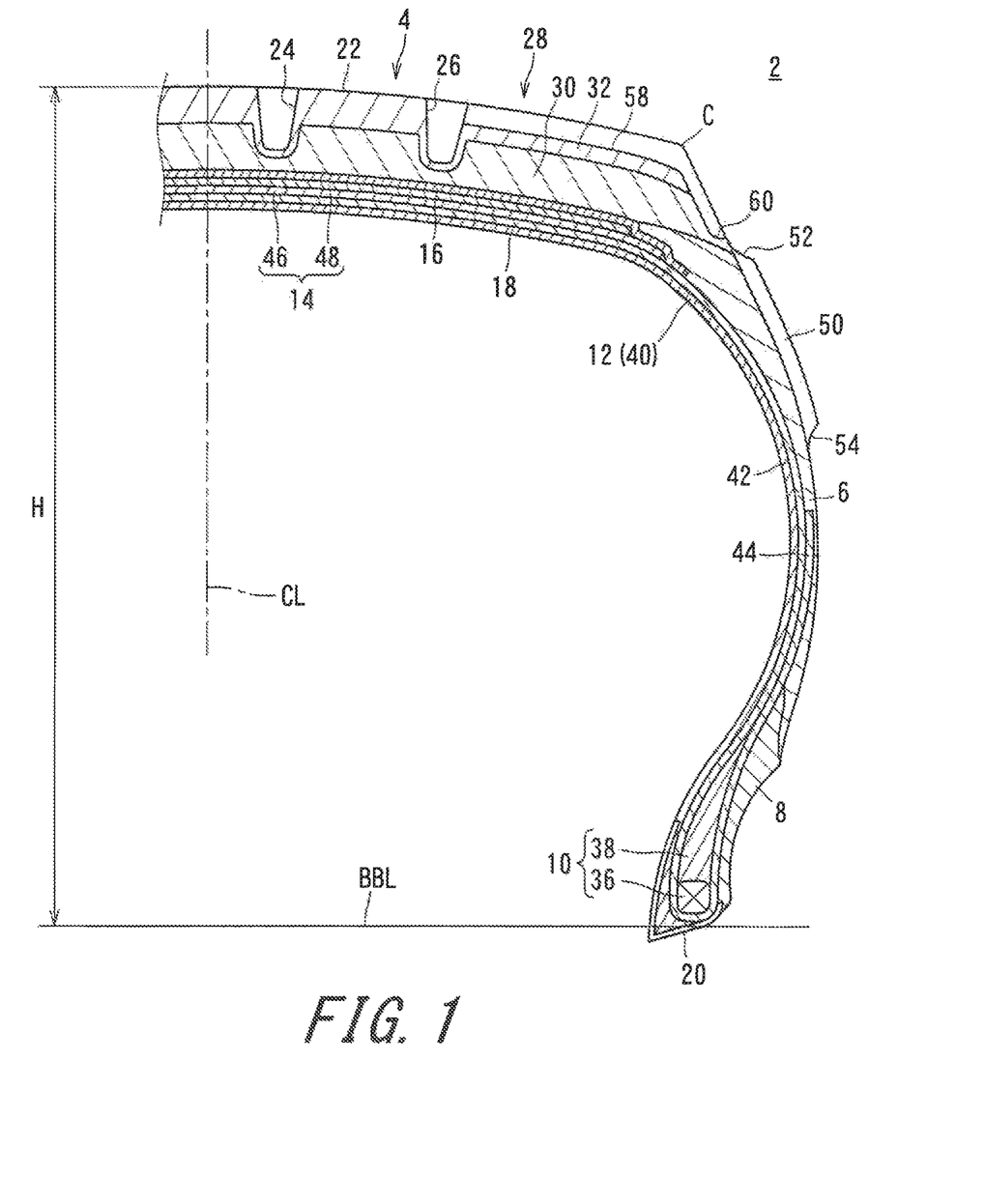
FIG. 1 is a cross-sectional view, taken along a meridian, of a part of a pneumatic tire according to an embodiment of the present invention.

FIG. 1 shows a cross-section, taken along a meridian, of a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane CL except for a tread pattern. In FIG. 1, a solid line BBL is a bead base line. The bead base line BBL is a line that defines the rim diameter (see JATMA) of a rim (not shown) to which the tire 2 is mounted. The bead base line BBL extends in the axial direction. In FIG. 1, an arrow H represents the height of the tire 2 from the bead base line BBL.

The tire 2 includes a tread 4, a pair of sidewalls 6, a pair of clinches 8, a pair of beads 10, a carcass 12, a belt 14, a band 16, an inner liner 18, and a pair of chafers 20. The tire 2 is of a tubeless type. The tire 2 is mounted to, for example, a sports utility vehicle (SUV).

The tread 4 has a shape projecting outward in the radial direction. The tread 4 forms a tread surface 22 that is brought into contact with a road surface. A first main groove 24 and a second main groove 26 are formed on the tread 4. A portion of the tread 4 at the outer side in the axial direction with respect to the second main groove 26 is a shoulder 28.

The tread 4 includes a base layer 30 and a cap layer 32. The cap layer 32 is located outward of the base layer 30 in the radial direction. The cap layer 32 is layered on the base layer 30. The base layer 30 is formed from a crosslinked rubber that has excellent adhesiveness. The cap layer 32 is formed from a crosslinked rubber that has excellent wear resistance, heat resistance, and grip performance.

Each sidewall 6 extends from the edge of the tread 4 substantially inward in the radial direction. The sidewall 6 is formed from a crosslinked rubber that has excellent cut resistance and weather resistance. The sidewall 6 prevents damage to the carcass 12.

Each clinch 8 is located substantially inward of the sidewall 6 in the radial direction. The clinch 8 is joined to the radially inner end of the sidewall 6. The clinch 8 extends from the inner end of the sidewall 6 substantially inward in the radial direction. The clinch 8 is formed from a crosslinked rubber that has excellent wear resistance. The clinch 8 comes into contact with a flange of the rim.

Each bead 10 is located inward of the clinch. 8 in the axial direction. The bead 10 includes a core 36 and an apex 38. The core 36 has a ring shape and includes a wound non-stretchable wire. A typical material of the wire is steel. The apex 38 extends from the core 36 outward in the radial direction. The apex 38 is tapered outward in the radial direction. The apex 38 is formed from a highly hard crosslinked rubber.

The carcass 12 includes a carcass ply 40. The carcass ply 40 extends on and between the beads 10 at both sides along the tread 4 and the sidewalls 6. The carcass ply 40 is turned up around each core 36 from the inner side toward the outer side in the axial direction. Because of this turning-up, a main portion 42 and turned-up portions 44 are formed in the carcass ply 40.

The carcass ply 40 includes a large number of cords aligned with each other, and a topping rubber. The absolute value of the angle of each cord relative to the equator plane CL is 75° to 90°. In other words, the carcass 12 has a radial structure. The cords are formed from an organic fiber. Examples of preferable organic fibers include polyester fibers, polyamide fibers, rayon fibers, polyethylene naphthalate fibers, and aramid fibers. The carcass 12 may be formed from two or more plies.

The belt 14 is located inward of the tread 4 in the radial direction. The belt 14 is layered over the carcass 12. The belt 14 reinforces the carcass 12. The belt 14 includes an inner layer 46 and an outer layer 48. As is obvious from FIG. 1, in the axial direction, the width of the inner layer 46 is slightly larger than that of the outer layer 48. Although not shown in FIG. 1, each of the inner layer 46 and the outer layer 48 includes a large number of cords aligned with each other, and a topping rubber. Each cord is tilted relative to the equator plane CL. The absolute value of a tilt angle is generally not less than 10° and not greater than 35°. The direction in which the cords of the inner layer 46 are titled relative to the equator plane CL is opposite to the direction in which the cords of the outer layer 48 are tilted relative to the equator plane CL. The material of the cords is preferably steel. An organic fiber may be used for the cords. The width in the axial direction of the belt 14 is preferably equal to or greater than 0.7 times the maximum width of the tire 2. The belt 14 may include three or more layers.

The band 16 is located outward of the belt 14 in the radial direction. The width of the band 16 is larger than the width of the belt 14 in the axial direction. The band 16 includes a cord and a topping rubber, which are not shown. The cord is helically wound. The band 16 has a so-called jointless structure. The cord extends substantially in the circumferential direction. The angle of the cord relative to the circumferential direction is not greater than 5°. The angle is preferably not greater than 2°. The belt 14 is held by the cord, so that lifting of the belt 14 is suppressed. The cord is formed from an organic fiber. Examples of preferable organic fibers include polyamide fibers, polyester fibers, rayon fibers, polyethylene naphthalate fibers, and aramid fibers.

The belt 14 and the band 16 form a reinforcing layer. The reinforcing layer reinforces the carcass 12. The reinforcing layer may be composed of only the belt 14. The reinforcing layer may be composed of only the band 16.

The inner liner 18 is located inward of the carcass 12. The inner liner 18 is joined to the inner surface of the carcass 12. The inner liner 18 is formed from a crosslinked rubber that has an excellent air blocking property. A typical base rubber of the inner liner 18 is an isobutylene-isoprene-rubber or a halogenated isobutylene-isoprene-rubber. The inner liner 18 maintains the internal pressure of the tire 2.

Figure 2:
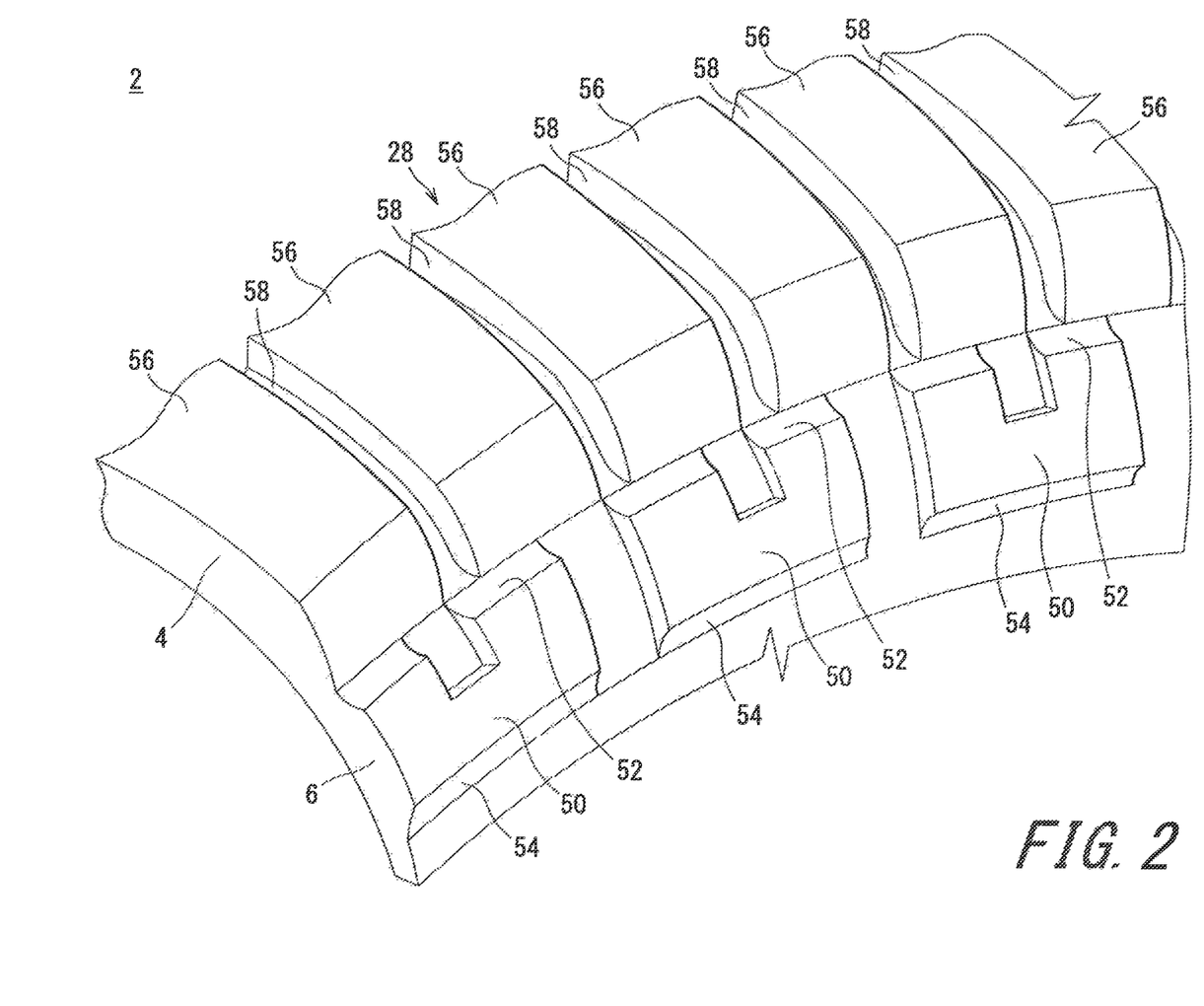
FIG. 2 is a perspective view of a part of the tire in FIG. 1.

FIG. 2 is a perspective view of a part of the tire in FIG. 1. FIG. 2 shows the vicinity of a buttress. In the present specification, the buttress is the boundary between the tread 4 and the sidewall 6.

As shown in FIGS. 1 and 2, the tire 2 has a large number of protector ribs 50 on a side surface thereof. The side surface is a surface that can be seen from a point at infinity on the axis of the tire 2, of the surface of the tire 2. These protector ribs 50 are aligned in the circumferential direction. Each of the protector ribs 50 is formed from a crosslinked rubber. The protector ribs 50 are separated from the protector ribs 50 adjacent thereto. The protector ribs 50 project from a profile. In the present invention, the profile is a contour of the outer surface of the tire 2. For the tire 2 having irregularities such as projections and recesses on the outer surface thereof, a contour obtained by assuming that the irregularities are not present is the profile.

Figure 3:
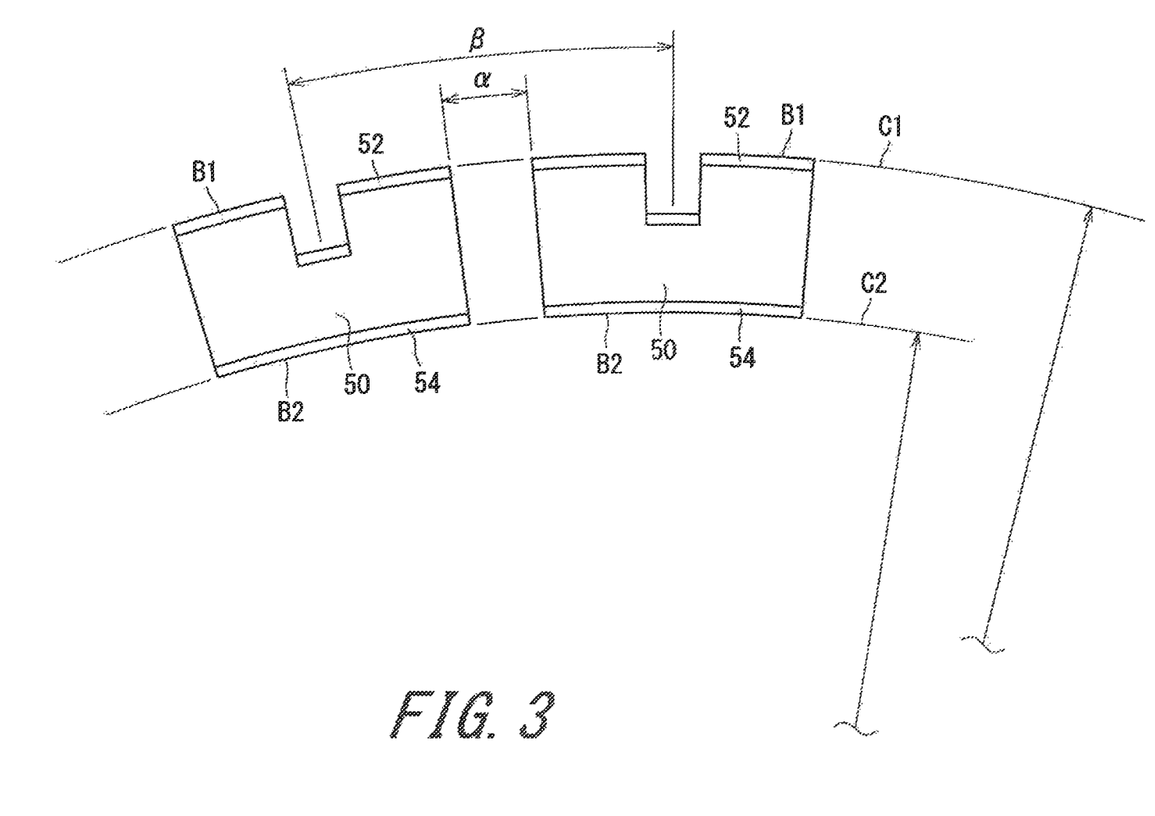
FIG. 3 is an enlarged view of a part of a side surface of the tire in FIG. 1.

The protector ribs 50 inhibit stones and the like from coming into contact with the sidewall 6 during running with the tire 2. The protector ribs 50 contribute to the cut resistance of the tire 2. When the tire 2 is used for running on a mud road surface, the protector ribs 50 shear mud. This shearing imparts traction to the tire 2. The tire 2 has excellent mud traction performance, FIG. 3 is an enlarged view of a part of the side surface of the tire 2 in FIG. 1. FIG. 3 shows the protector ribs 50. Each of the protector ribs 50 has an outer end 52 and an inner end 54. As is obvious from FIGS. 1 and 3, the outer end 52 is a radially outer end, and the inner end 54 is a radially inner end.

Figure 4:
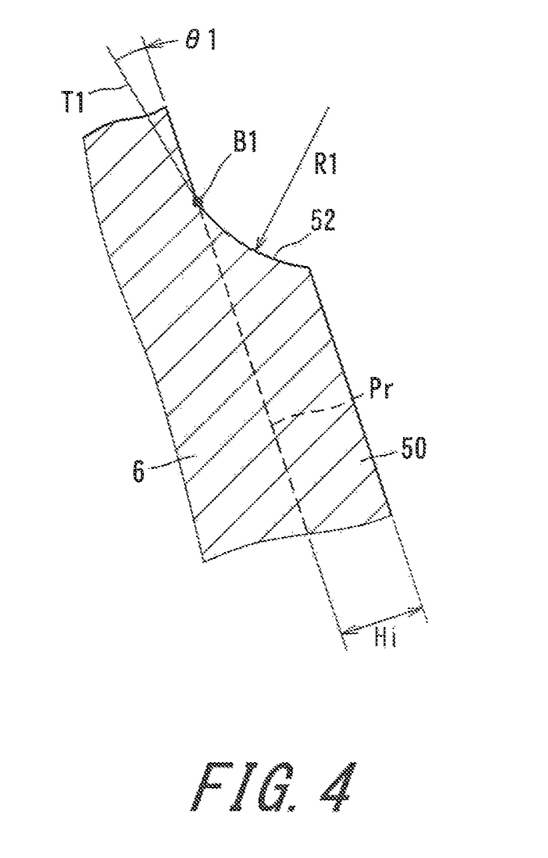
FIG. 4 is an enlarged cross-sectional view of a part of the tire in FIG. 1.

FIG. 4 is an enlarged cross-sectional view of a part of the tire 2 in FIG. 1. FIG. 4 shows a cross-section, taken along the meridian, of the tire 2. In FIG. 4, the up-down direction is the radial direction of the tire 2, and the right-left direction is the axial direction of the tire 2. FIG. 4 shows the vicinity of the outer end 52. Reference character T1 represents a tangent line that is tangent to the outer end 52 at a boundary B1 between a profile Pr and the protector rib 50. Reference character θ1 is the intersection angle of the tangent line T1 relative to the profile Pr. The intersection angle θ1 is measured counterclockwise in FIG. 4.

As is obvious from FIG. 4, the cross-sectional shape of the outer end 52 is convex inward in the axial direction (leftward in FIG. 4). Therefore, the intersection angle θ1 of the outer end 52 relative to the profile Pr is small. In the tire 2 in which the intersection angle θ1 is small, even when great force is applied to the protector rib 50, stress is not concentrated in the vicinity of the boundary B1. Therefore, in the tire 2, a crack is less likely to occur in the vicinity of the boundary B1. The tire 2 has excellent durability.

From the viewpoint of durability, the intersection angle θ1 is preferably not greater than 10°, more preferably not greater than 7°, and particularly preferably not greater than 5°. The intersection angle θ1 is preferably not less than 0°. The intersection angle θ1 is ideally 0°. When the intersection angle θ1 as 0°, the outer end 52 is tangent to the profile Pr.

In the present embodiment, the cross-sectional shape of the outer end 52 is a circular arc. In the tire 2 having the outer end 52 with a cross-sectional shape that is a circular arc, concentration of stress is less likely to occur. The tire 2 has excellent durability. From the viewpoint of durability, the radius R1 of the circular arc is preferably not less than 20 mm and not greater than 200 mm. The radius R1 is more preferably not less than 40 mm and particularly preferably not less than 50 mm. The radius R1 is more preferably not greater than 150 mm and particularly preferably not greater than 100 mm.

It is sufficient that the cross-sectional shape of the outer end 52 is convex inward in the axial direction. Therefore, the cross-sectional shape may be a curved line other than a circular arc. The cross-sectional shape may be a combination of multiple circular arcs, a combination of multiple straight lines, a combination of a circular arc and a straight line, or the like.

In FIG. 4, an arrow Hi represents the maximum height of the protector rib 50. From the viewpoint of mud traction performance, the maximum height Hi is preferably not less than 1.5 mm and particularly preferably not less than 2.0 mm. From the viewpoint of durability, the maximum height Hi is preferably not greater than 4.5 mm and particularly preferably not greater than 4.0 mm.

Figure 5:
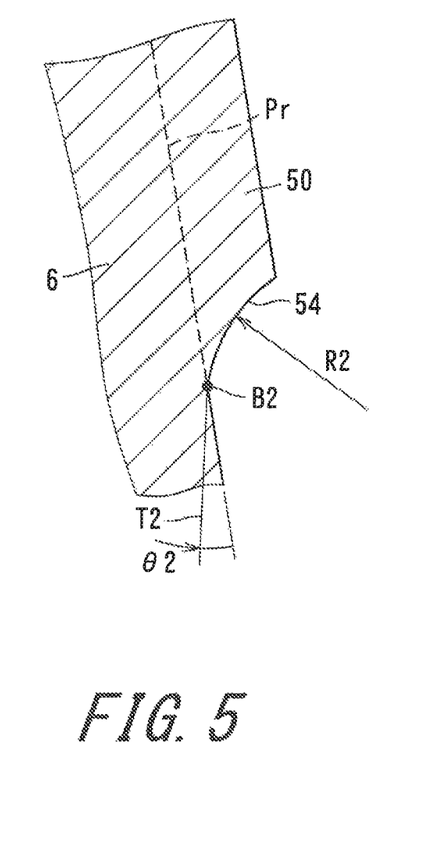
FIG. 5 is an enlarged cross-sectional view of a part of the tire in FIG. 1.

FIG. 5 is an enlarged cross-sectional view of a part of the tire 2 in FIG. 1. FIG. 5 shows a cross-section, taken along the meridian, of the tire 2. In FIG. 5, the up-down direction is the radial direction of the tire 2, and the right-left direction is the axial direction of the tire 2. FIG. 5 shows the vicinity of the inner end 54. Reference character T2 represents a tangent line that is tangent to the inner end 54 at a boundary B2 between the profile Pr and the protector rib 50. Reference character θ2 is the intersection angle of the tangent line T2 relative to the profile Pr. The intersection angle θ2 is measured counterclockwise in FIG. 5.

As is obvious from FIG. 5, the cross-sectional shape of the inner end 54 is convex inward in the axial direction (leftward in FIG. 5). Therefore, the intersection angle θ2 of the inner end 54 relative to the profile Pr is small. In the tire 2 in which the intersection angle θ2 is small, even when great force is applied to the protector rib 50, stress is not concentrated in the vicinity of the boundary B2. Therefore, in the tire 2, a crack is less likely to occur in the vicinity of the boundary 32. The tire 2 has excellent durability.

From the viewpoint of durability, the intersection angle θ2 is preferably not greater than 10°, more preferably not greater than 7°, and particularly preferably not greater than 5°. The intersection angle θ2 is preferably not less than 0°. The intersection angle θ2 is ideally 0°. When the intersection angle θ2 is 0°, the inner end 54 is tangent to the profile Pr.

In the present embodiment, the cross-sectional shape of the inner end 54 is a circular arc. In the tire 2 having the inner end 54 with a cross-sectional shape that is a circular arc, concentration of stress is less likely to occur. The tire 2 has excellent durability. From the viewpoint of durability, the radius R2 of the circular arc is preferably not less than 20 mm and not greater than 200 mm. The radius R2 is more preferably not less than 40 mm and particularly preferably not less than 50 mm. The radius R2 is more preferably riot greater than 150 mm and particularly preferably not greater than 100 mm.

It is sufficient that the cross-sectional shape of the inner end 54 is convex inward in the axial direction. Therefore, the cross-sectional shape may he a curved line other than a circular arc. The cross-sectional shape may be a combination of multiple circular arcs, a combination of multiple straight lines, a combination of a circular arc and a straight line, or the like.

The tire 2 may have a protector rib 50 having: an outer end 52 that is convex inward in the axial direction; and an inner end 54 that is not convex inward in the axial direction. The tire 2 may have a protector rib 50 having: an outer end 52 that is not convex inward in the axial direction; and an inner end 54 that is convex inward in the axial direction.

FIG. 2 also shows the shoulder 28 of the tread 4. The shoulder 28 has a large number of lugs 56 and a large number of lateral grooves 58. These lugs 56 and these lateral grooves 58 are alternately arranged along the circumferential direction. Each of the lugs 56 is interposed between two lateral grooves 58. Each of the lateral grooves 58 is interposed between two lugs 56. As is obvious from FIG. 1, the lateral grooves 38 extend substantially in the axial direction at the inner side in the axial direction with respect to a corner C of the tread 4. The lateral grooves 58 extend in an oblique direction at the outer side in the axial direction with respect to the corner C. Specifically, at the outer side in the axial direction with respect to the corner C, the lateral grooves 58 extend in a direction toward the inner side in the radial direction while extending toward the outer side in the axial direction. In FIG. 1, reference character 60 represents an end of the lateral groove 58. The end 60 is located at the outermost side of the lateral groove 58 in the axial direction.

Figure 6:
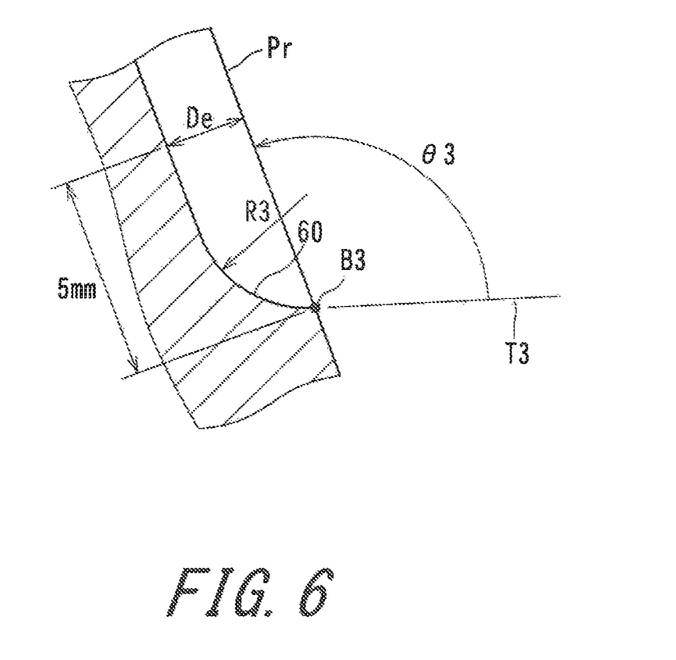
FIG. 6 is an enlarged cross-sectional view of a part of the tire in FIG. 1.

FIG. 6 is an enlarged cross-sectional view of a part of the tire 2 in FIG. 1. FIG. 6 shows a cross-section, taken along the meridian, of the tire 2. In FIG. 6, the up-down direction is the radial direction of the tire 2, and the right-left direction is the axial direction of the tire 2. FIG. 6 shows the vicinity of the end 60. Reference character T3 represents a tangent line that is tangent to the end 60 at a boundary B3 between the profile Pr and the lateral groove 58.

In FIG. 6, reference character θ3 is the intersection angle of the tangent line T3 relative to the profile Pr. The intersection angle θ3 is measured counterclockwise in FIG. 6. The intersection angle θ3 is preferably not less than 100°. In the tire 2 in which the intersection angle θ3 is not less than 100°, even when great force is applied to the protector rib 50, stress is not concentrated in the vicinity of the boundary B1 (see FIG. 4). Therefore, in the tire 2, a crack is less likely to occur in the vicinity of the boundary B1. The tire 2 has excellent durability. From the viewpoint of durability, the intersection angle θ3 is more preferably not less than 105° and particularly preferably not less than 110°. The intersection angle θ3 is preferably not greater than 140°, more preferably not greater than 135°, and particularly preferably not greater than 130°.

In the present embodiment, the cross-sectional shape of the end 60 is a circular arc. The radius R3 of the circular arc is preferably not less than 20 mm and not greater than 200 mm. The cross-sectional shape may be a curved line other than a circular arc. The cross-sectional shape may be a combination of multiple circular arcs, a combination of multiple straight lines, a combination of a circular arc and a straight line, or the like.

In FIG. 6, an arrow De represents the depth of the lateral groove 58. The depth De is measured at a point away from the boundary B3 by 5 mm. From the viewpoint of mud traction performance, the depth De is preferably not less than 1.5 mm and particularly preferably not less than 2.0 mm. From the viewpoint of durability, the depth De is preferably not greater than 4.5 mm and particularly preferably not greater than 4.0 mm.

The sum (Hi+De) of the maximum height Hi (see FIG. 4) of the protector rib 50 and the depth De of the lateral groove 58 is preferably not less than 4.5 mm and not greater than 6.5 mm. The tire 2 in which the sum (Hi+De) is not less than 4.5 mm has excellent mud traction performance. From this viewpoint, the sum (Hi+De) is particularly preferably not less than 5.0 mm. The rolling resistance of the tire 2 in which the sum (Hi+De) is not greater than 6.5 mm is low. From this viewpoint, the sum (Hi+De) is particularly preferably not greater than 6.0 mm.

In FIG. 3, reference character C1 represents a circle. For convenience sake, a circular arc that is a part of the circle C1 is shown in FIG. 3. The circle C1 coincides with the boundary B1 of each protector rib 50. The center of the circle C1 coincides with the axis of the tire 2.

In FIG. 3, reference character C2 represents another circle. For convenience sake, a circular arc that is a part of the circle C2 is shown in FIG. 3. The circle C2 coincides with the boundary B2 of each protector rib 50. The center of the circle C2 coincides with the axis of the tire 2.

In the present invention, a ratio Pp is calculated by the following mathematical formula, $$Pp=(Sp/Ss)*100$$

In this mathematical formula, Ss represents the area of a zone between the circle C1 and the circle C2, of the side surface, and Sp represents the total area of the protector ribs 50 that are present in this zone. The areas Ss and Sp are measured in a state where the side surface is seen from a point at infinity on the axis of the tire 2.

The ratio Pp is preferably not less than 30% and not greater than 90%. The tire 2 in which the ratio Pp is not less than 30% has excellent cut resistance. From this viewpoint, the ratio Pp is more preferably not less than 50% and particularly preferably not less than 55%. The rolling resistance of the tire 2 in which the ratio Pp is not greater than 90% is low. The tire 2 in which the ratio Pp is not greater than 90% is lightweight. From these viewpoints, the ratio Pp is more preferably not greater than 80% and particularly preferably not greater than 75%.

In FIG. 3, reference character a represents the central angle of the maximum gap between the protector rib 50 and the protector rib 50 adjacent thereto. In FIG. 3, reference character β represents the pitch angle between the protector rib 50 and the protector rib 50 adjacent thereto. The ratio of the central angle α to the pitch angle β is preferably not less than 20% and not greater than 40%. The rolling resistance of the tire 2 in which this ratio is not less than 20% is low. From this viewpoint, this ratio is particularly preferably not less than 25%. The tire 2 in which this ratio is not greater than 40% has excellent cut resistance. From this viewpoint, this ratio is particularly preferably not greater than 35%. In the tire 2 in which the angle α or the angle β is not uniform, the average of all the central angles in the side surface is the angle α, and the average of all the pitch angles in the side surface is the angle β.

The hardness of each protector rib 50 is preferably not less than 50 and not greater than 90. The protector rib 50 having a hardness of not less than 50 can contribute to cut resistance. From this viewpoint, the hardness is more preferably not less than 55 and particularly preferably not less than 60. The rolling resistance of the tire 2 having the protector ribs 50 each having a hardness of not greater than 90 is low. From this viewpoint, the hardness is more preferably not greater than 85 and particularly preferably not greater than 80. The hardness is measured by pressing a JIS-A hardness scale against the side surface shown in FIG. 3. The temperature at the time of measurement is 23° C.

In the tire 2, the dimensions and angles of each component of the tire 2 are measured in a state where the tire 2 is mounted on a normal rim and inflated with air to a normal internal pressure, unless otherwise specified. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa.

EXAMPLES

Example 1

A pneumatic tire having the structure shown in FIGS. 1 to 6 was obtained. The size of the tire was "265/65R18 114V". The tire has protector ribs. The cross-sectional shape of the outer end of each protector rib is a circular arc. The radius R1 of the circular arc is 110 mm. The intersection angle $\theta 1$ of the outer end is 0°. The cross-sectional shape of the inner end of each protector rib is a circular arc. The radius R2 of the circular arc is 110 mm. The intersection angle $\theta 2$ of the inner end is 0°. The tire has lateral grooves. The intersection angle $\theta 3$ of an end of each lateral groove is 120°. The sum (Hi+De) is 5.5 mm.

Examples 2 and 3

Pneumatic tires of Examples 2 and 3 were obtained in the same manner as Example 1, except the sum (Hi+De) was set as shown in Table 1 below.

Examples 4 and 5

Pneumatic tires of Examples 4 and 5 were obtained in the same manner as Example 1, except the intersection angle $\theta 3$ was set as shown in Table 1 below.

Examples 6 and 7

Pneumatic tires of Examples 6 and 7 were obtained in the same manner as Example 1, except the radii R1 and R2 were set as shown in Table 2 below.

Examples 8 and 9

Pneumatic tires of Examples 8 and 9 were obtained in the same manner as Example 1, except the intersection angles $\theta 1$ and $\theta 2$ were set as shown in Table 2 below.

Examples 10 and 11 and Comparative Example 1

A pneumatic tire of Example 10 was obtained in the same manner as Example 1, except the cross-sectional shape of the inner end is a straight line. A pneumatic tire of Example 11 was obtained in the same manner as Example 1, except the cross-sectional shape of the outer end is a straight line. A pneumatic tire of Comparative Example 1 was obtained in the same manner as Example 1, except the cross-sectional shapes of the outer end and the inner end are straight lines.

[Mud Traction Performance]

Each tire was fitted to a normal rim and inflated with air to an internal pressure of 230 kPa. The tire was mounted to a sports utility vehicle having a weight of 2800 kg. The vehicle was caused to run on muddy ground having a depth of 200 mm, and sensory evaluation of traction performance was made by the driver. The result is shown as an index in Tables 1 to 3 below. The higher the value is, the better the result is.

[Durability]

Each tire was fitted to a normal rim and inflated with air to an internal pressure of 250 kPa. The tire was mounted to a drum type tire testing machine, and a vertical load of 13.54 kN was applied to the tire. Running with the tire on a drum having a radius of 1.7 m at a speed of 100 km/h was performed. A running distance until damage to the tire was recognized was measured. The result is shown as an index in Tables 1 to 3 below. The higher the value is, the better the result is.

[Rolling Resistance]

Each tire was fitted to a normal rim and inflated with air to an internal pressure of 210 kPa. The tire was mounted to a drum type rolling resistance testing machine, and a vertical load of 9.26 kN was applied to the tire. Running with the tire at a speed of 80 km/h was performed, and a rolling resistance coefficient was measured. The reciprocal of the rolling resistance coefficient is shown as an index in Tables 1 to 3 below. The higher the value the better the result is.

TABLE 1

| | Results of Evaluation | | | | |
|---|---|---|---|---|---|
| | Example 1 | Example 2 | Example 3 | Example 4 | Example 5 |
| Outer end | Circular arc | Circular arc | Circular arc | Circular arc | Circular arc |
| R1 (mm) | 110 | 110 | 110 | 110 | 110 |
| θ1 (degree) | 0 | 0 | 0 | 0 | 0 |
| Inner end | Circular arc | Circular arc | Circular arc | Circular arc | Circular arc |
| R2 (mm) | 110 | 110 | 110 | 110 | 110 |
| θ2 (degree) | 0 | 0 | 0 | 0 | 0 |
| θ3 (degree) | 120 | 120 | 120 | 100 | 140 |
| Hi + De (mm) | 5.5 | 45 | 6.5 | 5.5 | 5.5 |
| M.T. | 100 | 95 | 105 | 100 | 100 |
| Durability | 120 | 120 | 120 | 105 | 120 |
| Rolling resistance | 100 | 105 | 95 | 100 | 95 |

M.T.: mud traction performance

TABLE 2

| | Results of Evaluation | | | |
|---|---|---|---|---|
| | Example 6 | Example 7 | Example 8 | Example 9 |
| Outer end | Circular arc | Circular arc | Circular arc | Circular arc |
| R1 (mm) | 20 | 200 | 110 | 110 |
| θ1 (degree) | 0 | 0 | 10 | 20 |
| Inner end | Circular arc | Circular arc | Circular arc | Circular arc |
| R2 (mm) | 20 | 200 | 110 | 110 |
| θ2 (degree) | 0 | 0 | 10 | 20 |
| θ3 (degree) | 120 | 120 | 120 | 120 |
| Hi + De (mm) | 5.5 | 5.5 | 5.5 | 5.5 |
| M.T. | 100 | 100 | 100 | 100 |
| Durability | 105 | 120 | 115 | 105 |
| Rolling resistance | 100 | 95 | 100 | 100 |

M.T.: mud traction performance

TABLE 3

| | Results of Evaluation | | |
|---|---|---|---|
| | Example 10 | Example 11 | Comp. Example 1 |
| Outer end | Circular arc | Straight line | Straight line |
| R1 (mm) | 110 | — | — |
| θ1 (degree) | 0 | 45 | 45 |
| Inner end | Straight line | Circular arc | Straight line |
| R2 (mm) | — | 110 | — |
| θ2 (degree) | 45 | 0 | 45 |
| θ3 (degree) | 120 | 120 | 120 |
| Hi + De (mm) | 5.5 | 5.5 | 5.5 |
| M.T. | 100 | 100 | 100 |
| durability | 110 | 110 | 100 |
| rolling resistance | 100 | 100 | 100 |

M.T.: mud traction performance

As shown in Tables 1 to 3, the pneumatic tire of each Example is excellent in various performance characteristics. From the results of the evaluation, advantages of the present invention are clear.

The tire according to the present invention can be mounted to various vehicles. The above descriptions are merely illustrative examples, and various modifications can be made without departing from the principles of the present invention.

What is claimed is:

1. A pneumatic tire comprising:
   a tread having a shoulder with lateral grooves alternatingly formed between lugs in a circumferential direction, the lateral grooves, extending axially outwardly from a corner of the tread, extend radially inwardly to outer axial ends;
   a sidewall;
   protector ribs projecting from a profile of the tire having radially upper ends and radially lower ends, where adjacent protector ribs are separated from each other by a gap,
   wherein a shape of a cross-section, taken along a meridian of the tire, of the radially uppermost end of each protector rib is convex inward in an axial direction,
   and wherein each protector rib is arranged so that at least a first part of the radially uppermost end contacts an entire width of one of the lateral grooves at the outer axial end of the one of the lateral grooves.

2. The pneumatic tire according to claim 1, wherein at least one of the radially upper end or the radially lower end has an intersection angle of not greater than 10° to the profile.

3. The pneumatic tire according to claim 1, wherein the shape of the cross-section is a curved line.

4. The pneumatic tire according to claim 3, wherein the shape of the cross-section is a circular arc.

5. The pneumatic tire according to claim 4, wherein the circular arc has a radius of not less than 20 mm and not greater than 200 mm.

6. The pneumatic tire according to claim 1, wherein an intersection angle of the axially outer ends of the lateral grooves relative to the profile is not less than 100° and not greater than 140°.

7. The pneumatic tire according to claim 6, wherein a sum (Hi+De) of a maximum height Hi of each protector rib and a depth De of the lateral grooves is not less than 4.5 mm and not greater than 6.5 mm.

8. The pneumatic tire according to claim 1, wherein each protector rib is arranged so that the entire width of each lateral groove at the outer axial ends uninterruptedly flows axially outwardly onto at least a part of the radially upper ends of the protector ribs.

9. The pneumatic tire according to claim 1, wherein the radially upper ends of the protector ribs directly contact the lateral grooves.

10. The pneumatic tire according to claim 1, wherein at least a second part of the radially uppermost end contacts an entire width of another of the lateral grooves, which is adjacent to the one of the lateral grooves, at the outer axial end of the another of the lateral grooves.

* * * * *